United States Patent
Hartke et al.

[11] Patent Number: 6,155,234
[45] Date of Patent: Dec. 5, 2000

[54] METHOD OF CONTROLLING A CONTROLLED VARIABLE WITH A LIMITED CONTROLLER ACTION

[75] Inventors: Andreas Hartke, München; Achim Przymusinski, Regensburg, both of Germany

[73] Assignee: Siemens Aktiengesellschaft, Munich, Germany

[21] Appl. No.: 09/386,005

[22] Filed: Aug. 30, 1999

Related U.S. Application Data

[63] Continuation of application No. PCT/DE98/00298, Feb. 3, 1998.

[30] Foreign Application Priority Data

Feb. 28, 1997 [DE] Germany .......................... 197 08 308

[51] Int. Cl.[7] .................................................. F02M 33/04
[52] U.S. Cl. ........................................................ 123/459
[58] Field of Search .................................. 123/457, 458, 123/459, 357

[56] References Cited

U.S. PATENT DOCUMENTS

| | | |
|---|---|---|
| 5,085,190 | 2/1992 | Brik et al. . |
| 5,121,604 | 6/1992 | Berger et al. . |
| 5,367,999 | 11/1994 | King et al. ............................. 123/458 |
| 5,467,000 | 11/1995 | Bauer et al. . |
| 5,718,207 | 2/1998 | Ito ......................................... 123/458 |
| 5,771,861 | 6/1998 | Musser et al. ......................... 123/357 |
| 5,862,791 | 1/1999 | Schoenfelder et al. ............... 123/357 |
| 5,957,109 | 9/1999 | Schoenfelder et al. ............... 123/357 |

FOREIGN PATENT DOCUMENTS

3621083A1 1/1988 Germany .

OTHER PUBLICATIONS

"Handbuch der Regelungstechnik", G. Bleisterer et al., Springer–Verlag, Berlin, Göttingen, Heidelberg, 1961, pp. 264–266.

*Primary Examiner*—Thomas N. Moulis
*Attorney, Agent, or Firm*—Herbert L. Lerner; Laurence A. Greenberg; Werner H. Stemer

[57] ABSTRACT

A method for controlling a pressure regulating valve is described. An actuating value with which the pressure regulating valve is driven is determined from a pilot control value and a controller action which depend on an actual value and a desired value of a controlled variable. In the event of a change in the desired variable, the controller action is limited to a limiting value that preferably depends on the pilot control value.

10 Claims, 4 Drawing Sheets

METHOD OF CONTROLLING A CONTROLLED VARIABLE WITH A LIMITED CONTROLLER ACTION

CROSS-REFERENCE TO RELATED APPLICATION

This is a continuation of copending International Application PCT/DE98/00298, filed Feb. 3, 1998, which designated the United States.

BACKGROUND OF THE INVENTION

Field of the Invention

The invention relates to a method of controlling a controlled variable which includes determining a pilot control value from a desired value of a controlled variable, determining a controller action from an actual value and the desired value of the controlled variable, and determining an actuating value, with which a actuator is driven, from the pilot control value and the controller action.

Methods of controlling a controlled variable are used in a wide variety of technical sectors and play an important part in particular in automotive engineering. During the control of a controlled variable, problems occur during readjustment, in particular in the event of a relatively large change in the controlled variable.

SUMMARY OF THE INVENTION

It is accordingly an object of the invention to provide a method of controlling a controlled variable with a limited controller action that overcomes the above-mentioned disadvantages of the prior art methods of this general type, in which the control is carried out precisely, even in the event of a change in the controlled variable.

With the foregoing and other objects in view there is provided, in accordance with the invention, a method of controlling an actuator, which includes determining a pilot control value from a desired value of a controlled variable; determining a controller action from an actual value of the controlled variable and the desired value of the controlled variable; limiting the controller action to a limiting value; and determining an actuating value for driving an actuator from the pilot control value and the controller action.

It is particularly advantageous, when controlling the controlled variable to limit the controller action to the limiting value.

Other features which are considered as characteristic for the invention are set forth in the appended claims.

Although the invention is illustrated and described herein as embodied in a method of controlling a controlled variable with a limited controller action, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
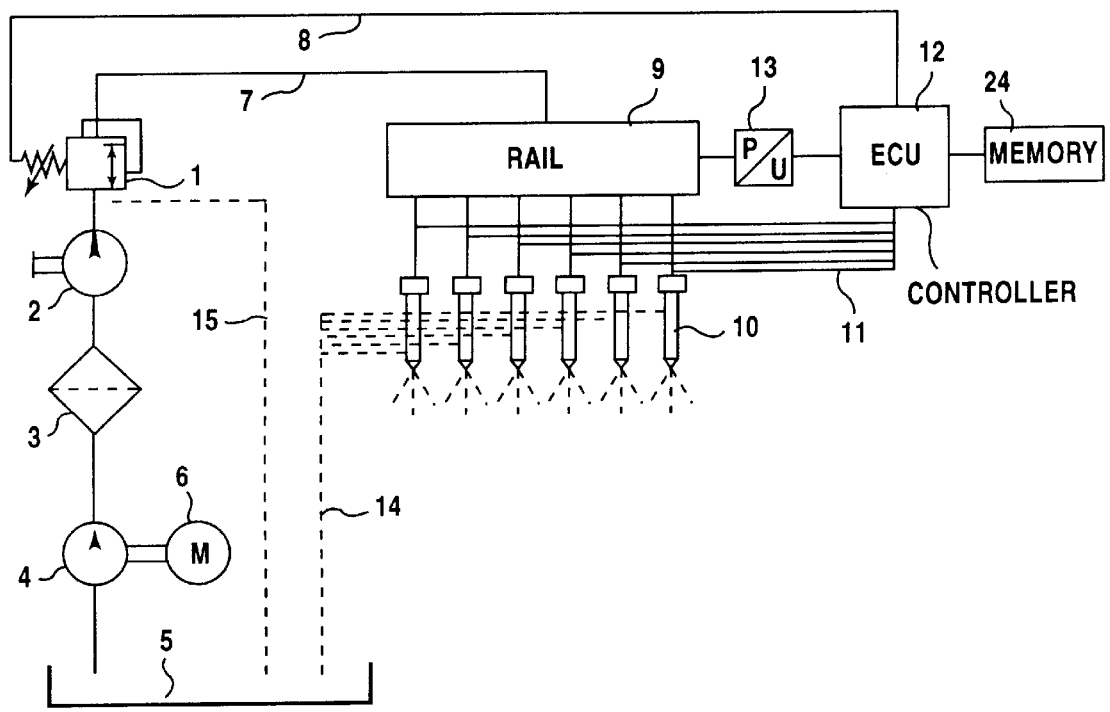
FIG. 1 is a diagrammatic, block diagram of an injection system having a pressure regulating valve according to the invention.

In all the figures of the drawing, sub-features and integral parts that correspond to one another bear the same reference symbol in each case. Referring now to the figures of the drawing in detail and first, particularly, to FIG. 1 thereof, there is shown a pilot delivery pump 4 that is driven by a motor 6 and delivers fuel from a fuel tank 5, via a filter 3, to a high-pressure pump 2 which can be driven. The high-pressure pump 2 compresses the fuel supplied to a predefined pressure and supplies the pressurized fuel via a high-pressure line 7 to a fuel reservoir 9. The fuel reservoir 9 is connected via fuel lines to injectors 10 that are connected via control lines 11 to a controller 12. The injectors 10 are connected via a leakage line 14 to the fuel tank 5. The controller 12 has a data store 24.

The fuel reservoir 9 has a pressure sensor 13, which is connected to the controller 12 via a signal line. The controller 12 is connected via a drive line 8 to a pressure regulating valve 1, which is incorporated in the high-pressure line 7. The pressure regulating valve 1 is connected via a return line 15 to the fuel tank 5.

The configuration shown in FIG. 1 functions as stated below. The fuel is delivered via the pilot delivery pump 4, the filter 3, the high-pressure pump 2 and the high-pressure line 7 to the fuel reservoir 9, a common rail, and from there is injected via the injectors 10 into appropriate combustion chambers of an internal combustion engine. The injection method is carried out by the controller 12 in accordance with predefined methods and as a function of operating conditions of the motor vehicle or of the internal combustion engine.

Different operating conditions of the internal combustion engine, such as idling, full load or overrun, require different levels of fuel pressure in the fuel reservoir 9. To this end, the controller 12 measures the fuel pressure in the fuel reservoir 9 and controls the fuel pressure by driving the pressure regulating valve 1 appropriately.

Figure 2:
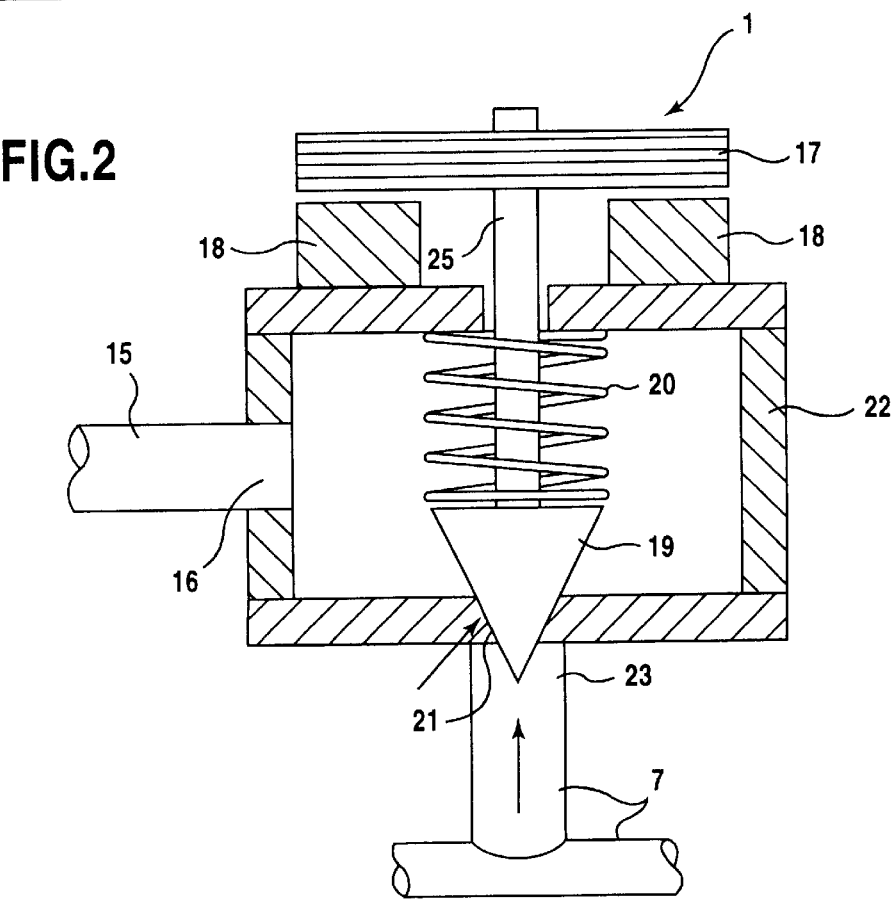
FIG. 2 is a sectional view of a pressure regulating valve.

FIG. 2 shows, in schematic form, the construction of the pressure regulating valve 1, which in this case can be operated electromagnetically. The pressure regulating valve 1 has a housing 22, in which a feed opening 23 and a discharge opening 16 are incorporated. The feed opening 23 is connected to the high-pressure line 7, and the discharge opening 16 is connected to the return line 15. The feed opening 23 is configured as a sealing seat 21 into which a valve element 19 matched to the sealing seat 21 is inserted. The valve element 19 is pressed against the sealing seat 21 by a valve spring 20, which is disposed between the housing 22 and the valve element 19. The valve element 19 is connected via a rod 25 to an armature 17, which is disposed outside the housing 22. In addition, a coil 18 that can be driven by the controller 12 is provided between the armature 17 and the housing 22.

The way in which the pressure regulating valve 1 functions is described below. In the rest state, the coil 18 is not driven, and the valve element 19 is merely pressed onto the sealing seat 21 with a predefined spring force by the valve spring 20. The fuel pressure prevailing in the high-pressure line 7 therefore lifts the valve element 19 off the sealing seat 21 as soon as the fuel pressure rises above the spring force of the valve spring 20. If the valve element 19 lifts off the sealing seat 21, fuel flows from the high-pressure line 7, via the pressure regulating valve 1 and the return line 15, back to the fuel tank 5. In this way, the fuel pressure prevailing in the fuel reservoir 9 is lowered.

By driving the coil 18 appropriately, the controller 12 establishes the pressure above which the valve element 19 is lifted off the sealing seat 21. In this way, the controller 12 adjusts the fuel pressure in the fuel reservoir 9. A pulse-width-modulated drive signal is preferably used to drive the coil 18.

Figure 3:
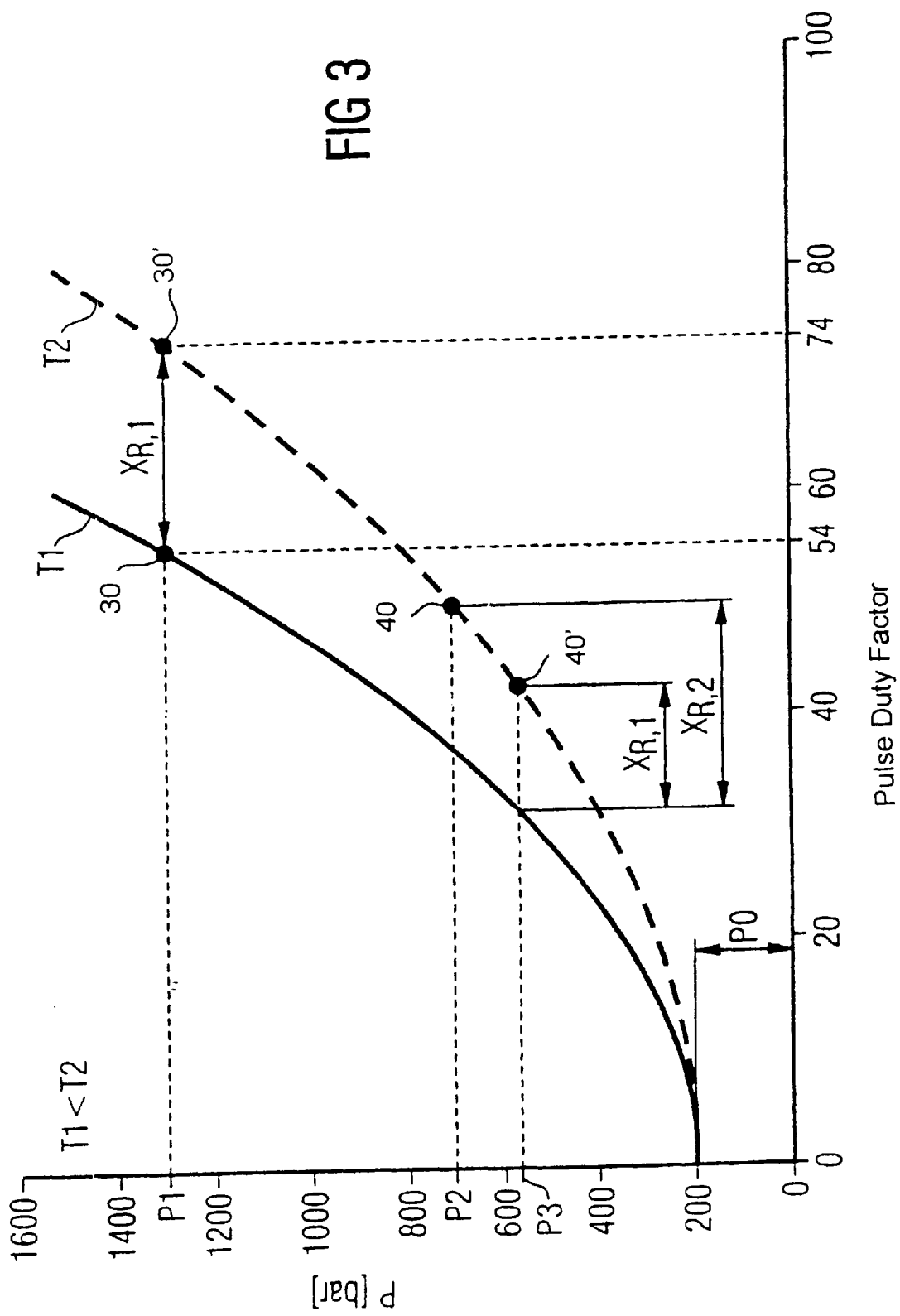
FIG. 3 is a graph showing a pulse duty factor of a drive signal for the pressure regulating valve as a function of fuel pressure.

FIG. 3 shows the pulse duty factor of the pulse-width-modulated drive signal with which the controller 12 drives the pressure regulating valve 1, as a function of the fuel pressure at which the driven pressure regulating valve 1 opens and returns fuel to the fuel tank 5. The pulse duty factors for two different temperatures T1 and T2 of the pressure regulating valve 1 are indicated in FIG. 3, the first temperature T1 being lower than the second temperature T2. It can be seen from FIG. 3 that, at a higher temperature T2 of the pressure regulating valve 1, in particular of the coil 18, a greater pulse duty factor for the drive signal of the pressure regulating valve 1 has to be predefined in order that the pressure regulating valve 1 opens at the same fuel pressure as at the lower temperature T1. This is explained by the fact that, at a higher temperature T2, the resistance of the coil 18 increases and therefore a greater pulse duty factor has to be selected for the same current flow at the lower temperature T1. The characteristic curve which is shown for the temperature T1 corresponds to the pulse duty factors which are defined by pilot control values $X_v$, and is therefore referred to as the pilot control characteristic curve. The pilot control characteristic curve having the corresponding pilot control values $X_v$ is determined experimentally and stored in the data store 24. The characteristic curve for the second temperature T2 is set by a corresponding controller action $X_{R,i}$ on the basis of the pilot control values.

It can be seen from FIG. 3 that the spring force predefined by the valve spring 20 corresponds to a minimum fuel pressure P0 of 200 bar. In the absence of any drive by the controller 12, the pressure regulating valve 1 therefore also only opens at a fuel pressure of 200 bar.

Figure 4:
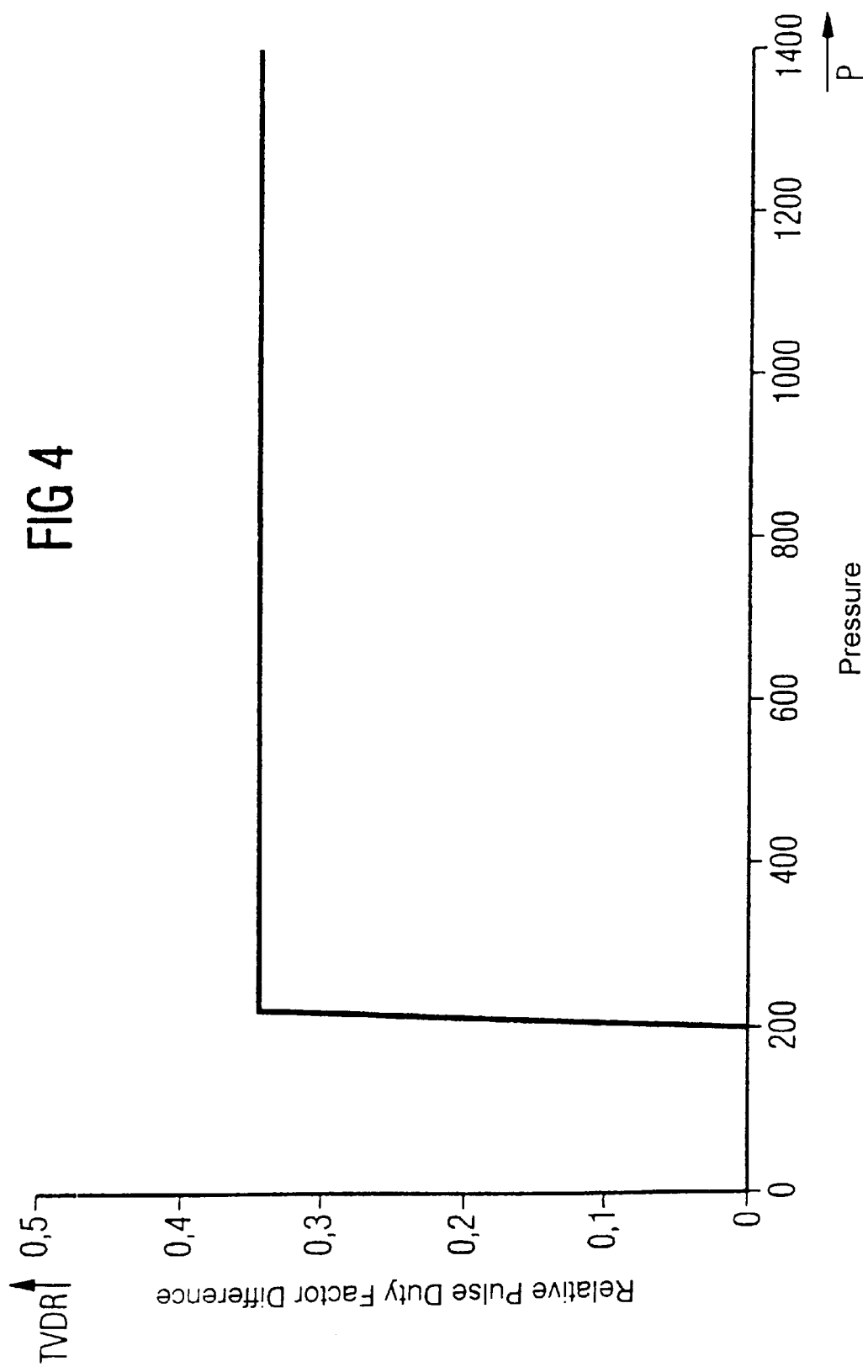
FIG. 4 is a graph of a relative pulse duty factor difference as a function of the fuel pressure.

FIG. 4 shows the relative pulse duty factor difference as a function of the fuel pressure. The relative pulse duty factor difference TVDR is defined as the coefficient of the pulse duty factor difference TVD in relation to the pilot control value $X_v$ at the first temperature T1: TVDR=TVD/$X_v$(T1)

The pulse duty factor difference TVD is the difference between the pulse duty factor TV(P1,T1) at a predefined first fuel pressure P1 and a predefined first temperature T1, and the pulse duty factor TV(P1, T2) at the first fuel pressure P1 and a second temperature T2: TVD=TV(P1,T2)−TV(P1, T1).

It can be seen from FIG. 4 that, in the initial range above 200 bar fuel pressure, the relative pulse duty factor difference TVDR rises abruptly to a value between 0.3 and 0.4 and then remains constant over the further fuel pressure range. Therefore, the difference in the pulse duty factor for two different temperatures, as related to the pilot control value, constitutes a constant value. This behavior is preferably used in the control method according to the invention.

Figure 5:
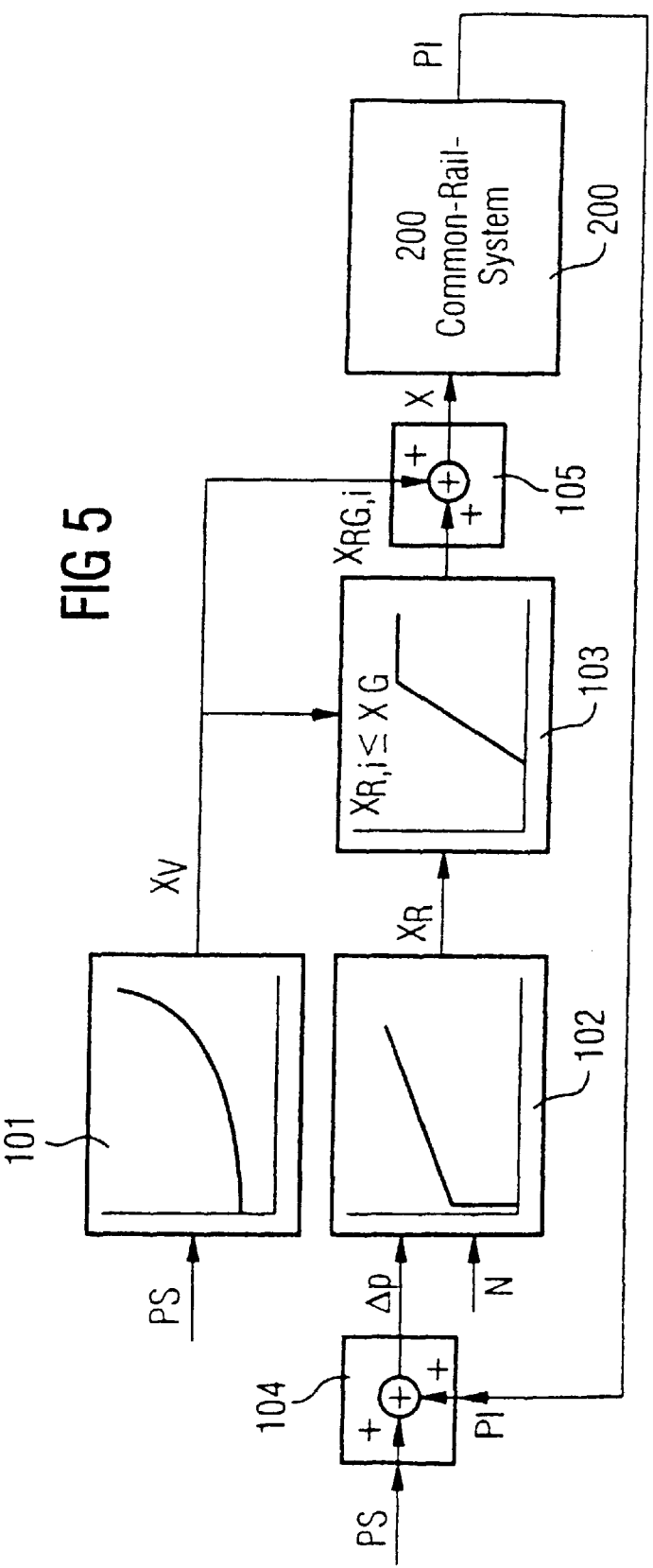
FIG. 5 is a block diagram of a control method.

FIG. 5 shows, in schematic form, the structure of a control method with which the controller 12 drives the pressure regulating valve 1 as a function of the fuel pressure in the fuel reservoir 9 and as a function of the temperature of the pressure regulating valve 1.

The controller 12 determines a desired pressure PS, which is to be set in the fuel reservoir 9, as a function of the operating conditions of the internal combustion engine, in particular of the load, the engine speed and the wishes of the driver. In the controller block 104, the desired pressure PS is compared with the pressure PI measured in the fuel reservoir 9, and a differential pressure Δp is determined. The differential pressure Δp is used in the controller block 102 to calculate a controller action $X_{R,i}$ in accordance with a predefined calculation rule:

$$x_{R,i} = x_{R,i-1} + K_R\left[\Delta p_i - \left(1 - \frac{T_A}{T_I}\right)\Delta p_{i-1}\right]$$

$K_R$ denoting a gain factor, $T_A$ denoting the sampling time, and $T_I$ denoting a predefined reset time. $X_{R,i}$ denotes the controller action at the time i, $X_{R,i-1}$ denotes the controller action at the time i−1, $\Delta p_i$ denotes the control deviation at the time i and $\Delta p_{i-1}$ denotes the control deviation at the time i−1.

The sampling time $T_A$ depends on a rotational speed N of the internal combustion engine and is preferably proportional to the rotational speed N. The controller action $X_{R,i}$ determined is subsequently limited, in a controller block 103, to a limiting value $X_G$. The controller action $X_{R,i}$ is limited as a function of the pilot control value $X_v$ to a limiting value XG: $X_{R,I} \leq X_G$. The limiting value $X_G$ preferably depends on the pilot control value $X_v$:$X_G$=C·$X_v$, C denoting a limiting factor which represents a constant and is determined experimentally. The sampling time $T_A$ is, for example, 0.002 s, the reset time $T_I$ is 0.07 s and the gain factor KR is 0.035%/MPa.

Using the desired pressure PS, the pilot control value $X_v$ is read by the controller 12, in a controller block 101, from a predefined characteristic map, which indicates pilot control values $X_v$ as a function of the desired pressure PS.

Following the limiting of the controller action $X_{R,i}$ in the controller block 103, the limited controller action $X_{RG,i}$ will be added, in the controller block 105, to the pilot control value $X_v$ determined in the controller block 101 to form an actuating value X, which is then fed to the pressure regulating valve 1 by the controller 12 in the controller block 200. As feedback, the controller 12 measures the fuel pressure PI prevailing in the fuel reservoir 9 and feeds this pressure back to the controller block 104.

The particular way in which the control method described functions is based on the fact that the controller action $X_{R,i}$ is limited to a limiting value. The limiting value is preferably directly proportional to the pilot control value that, together with the controller action, forms the actuating value.

A preferred development of the controller limitation is based on the fact that the limiting value $X_G$ depends in relative form on the pilot control value $X_v$ and therefore on the desired pressure PS. The limiting value $X_G$ is, for example, 10% of the pilot control value $X_v$.

In addition, an advantageous development of the controller limitation is based on developing the limiting value as a function of the operating conditions of the vehicle, in particular of the engine speed, the injection quantity, emergency running operation or the coolant temperature, since the quantity of fuel discharged via the pressure regulating valve, and hence the opening width of the pressure regulating valve, depend on the load point of the internal combustion engine. Appropriate relationships are determined experimentally and stored in the data store 24.

The limiting block 103 has the task of limiting the temperature influence on the drive signal, which is reflected in a magnitude of the controller action $X_{R,i}$, to a limiting value, in particular to a relative ratio to the pilot control value $X_v$.

The effects of the control method of FIG. 5 according to the invention will be explained with reference to FIG. 3. At the working point 30, at which the pressure regulating valve 1 has a first temperature T1, the controller 12 selects the desired working point 30 in accordance with the wishes of the driver, that is to say a gas pedal position, such that a fuel pressure of approximately 1300 bar is maintained in the fuel reservoir 9. If the working point 30 is maintained by the driver over a relatively long period, then the temperature of the pressure regulating valve 1 rises from the first temperature T1 to a second temperature T2, which is greater than the first temperature T1, as a result of the conversion of energy in the pressure regulating valve 1.

Since the controller 12 readjusts the pressure regulating valve 1, in the event of a constant pilot control value, the controller action $X_{R,1}$ is increased, since at a second temperature T2 a greater pulse duty factor is needed to drive the pressure regulating valve in order to establish the predefined first fuel pressure P1. At the working point 30 at a temperature T1, a pulse duty factor of 54% is sufficient, whereas at the working point 30' at the second temperature T2, a pulse duty factor of 74% is necessary in order to control the pressure regulating valve 1 appropriately for the fuel pressure of 1300 bar.

In the event of a change in the working point to a lower, third fuel pressure P3, if a non-limited controller action is used, the system initially moves to the second fuel pressure P2 at the working point 40, because of the large controller action which is still present, since the controller action $X_{R,1}$ is still present. A change in the working point is produced, for example, by a change in the load on the internal combustion engine. As a result of the excessively large controller action $X_{R,1}$, the controller 12 with the working point 40 establishes an excessively high second fuel pressure P2.

Only during the next calculation of the pulse duty factor is a new second controller action $X_{R,2}$ calculated, which corresponds to the third fuel pressure P3 at a working point 40' to which the system should actually move.

As a result of limiting the controller output to a fixed ratio to the pilot control value, a ratio depending on the temperature response of the pressure regulating valve and therefore on fixed material values, the controller action is reduced to the magnitude $X_{R,I}=X_{RG,i}$, via the simultaneous change to the pilot control value, immediately following the change to the desired pressure, and the system is therefore led to the working point 40' in a direct way. In this way, the phase of the undesirable pressure peak is avoided. The controller action is preferably limited as a function of the pilot control value and therefore as a function of the desired pressure. The controller action $X_{R,i}$ is preferably only limited when the controller action $X_{R,i}$ changes by a predefined value, preferably by more than 10%, with respect to the pilot control value $X_v$.

The method according to the invention is particularly advantageous in the event of abrupt changes to the working points, that is to say in the event of an abrupt change in the desired value PS for the fuel pressure. The controller limitation is preferably carried out when the desired pressure PS(i) changes by a predefined value, from one calculation step i to the next calculation step i+1, to a desired pressure PS(i+1) which is preferably more than 5% higher than the desired pressure PS(i).

The method presented for compensating for the temperature response of the pressure regulating valve is independent of the type of controller used. Since only the characteristics of the pressure regulating valve 1 are taken into account, this method can be used in any storage injection system which has an appropriate pressure regulating valve. This is also possible when a volume flow regulating valve is used for the high-pressure pump or the pilot delivery pump is controlled electrically.

We claim:

1. A method of controlling an actuator, which comprises:

determining a pilot control value from a desired value of a controlled variable;

determining a controller action from an actual value of the controlled variable and the desired value of the controlled variable;

limiting the controller action to a limiting value; and determining an actuating value for driving an actuator from the pilot control value and the controller action.

2. The method according to claim 1, which comprises setting the limiting value to depend on the pilot control value.

3. The method according to claim 1, which comprises setting the limiting value to be directly proportional to the pilot control value.

4. The method according to claim 1, which comprises using a pressure regulating valve of a fuel reservoir as the actuator to be controlled.

5. The method according to claim 4, wherein the limiting value depends on operating conditions of a motor vehicle.

6. The method according to claim 4, wherein the limiting value depends on one of an engine speed, an injection quantity, an emergency running operation and a coolant temperature of a motor vehicle.

7. The method according to claim 1, wherein the limiting value depends on the desired value.

8. The method according to claim 4, which comprises using the pressure regulating valve to control a fuel pressure in the fuel reservoir, and the controller action is limited to the limiting value which depends on the fuel pressure.

9. The method according to claim 1, which comprises limiting the controller action if the desired value changes by more than a predefined value.

10. The method according to claim 1, which comprises limiting the controller action if the desired value changes by more than 5% of the desired value.

* * * * *